United States Patent [19]
Masuda et al.

[11] Patent Number: 6,078,363
[45] Date of Patent: Jun. 20, 2000

[54] IMAGE DISPLAY APPARATUS

[75] Inventors: Takeshi Masuda; Takuji Yamatani, both of Tenri, Japan

[73] Assignee: Sharp Kabushiki Kaisha, Osaka, Japan

[21] Appl. No.: 08/962,277

[22] Filed: Oct. 31, 1997

[30] Foreign Application Priority Data

Nov. 11, 1996 [JP] Japan .................................... 8-298881
Aug. 28, 1997 [JP] Japan .................................... 9-232588

[51] Int. Cl.[7] ................................ H04N 5/74; G02F 1/00
[52] U.S. Cl. .......................... 348/752; 348/756; 348/762; 348/767; 349/9
[58] Field of Search ..................................... 348/751, 752, 348/756, 757, 761, 762, 766, 767; 349/9, 115; 359/280, 281, 282, 484

[56] References Cited

U.S. PATENT DOCUMENTS

| | | | |
|---|---|---|---|
| 4,073,571 | 2/1978 | Ginberg et al. | 349/194 |
| 4,500,172 | 2/1985 | Gagnon et al. | 349/9 |
| 5,153,752 | 10/1992 | Kurematsu et al. | 349/9 |
| 5,200,843 | 4/1993 | Karasawa et al. | 349/9 |
| 5,235,444 | 8/1993 | De Vaan | 349/487 |
| 5,295,009 | 3/1994 | Barnik et al. | 349/115 |
| 5,325,218 | 6/1994 | Willette et al. | 349/74 |
| 5,387,953 | 2/1995 | Minoura et al. | 353/20 |
| 5,452,128 | 9/1995 | Kimura | 359/487 |
| 5,506,704 | 4/1996 | Broer et al. | 349/98 |
| 5,515,202 | 5/1996 | Wright | 359/634 |
| 5,712,694 | 1/1998 | Taira et al. | 349/9 |
| 5,748,369 | 5/1998 | Yokota | 359/487 |
| 5,812,223 | 9/1998 | Noguchi | 349/9 |
| 5,815,221 | 9/1998 | Kojima et al. | 348/751 |
| 5,833,338 | 11/1998 | Barak | 353/20 |
| 5,899,551 | 5/1999 | Neijzen et al. | 349/115 |

FOREIGN PATENT DOCUMENTS

| | | |
|---|---|---|
| 2-93580 | 4/1990 | Japan . |
| 4-127120 | 4/1992 | Japan . |
| 4-178683 | 6/1992 | Japan . |
| 6-281814 | 10/1994 | Japan . |

OTHER PUBLICATIONS

Ishizaka, Y., Monthly Display, Aug., 1995, pp. 53–55.
Tsujiuchi, J., Introduction to Optics II, p. 203.
Weber, M. F., "23.3: Retroreflecting Sheet Polarizer", SID 92 Digest, 1992, pp. 427–429.

*Primary Examiner*—John K. Peng
*Assistant Examiner*—Linus H. Lo
*Attorney, Agent, or Firm*—Nixon & Vanderhye P.C.

[57] ABSTRACT

A projection-type image display apparatus, includes: an illumination unit; a polarization selecting and reflecting element which splits a light beam from the illumination unit into a first light beam and a second light beam having polarization states different from each other, reflects the first light beam to the illumination unit, and outputs the second light beam as linearly polarized light; a transmission-type liquid crystal display panel which controls a polarization state of the linearly polarized light and displays an image; a first polarization selecting element and a second polarization selecting element respectively provided on a light beam input side and a light beam output side of the transmission-type liquid crystal display panel; a projection element which projects the image displayed by the transmission-type liquid crystal display panel. A combination of the polarization selecting and reflecting element and the first polarization selecting element has a degree of polarization of at least about 99%, and at least one of the polarization selecting and reflecting element and the first polarization selecting element has a degree of polarization of less than about 99%.

7 Claims, 10 Drawing Sheets

IMAGE DISPLAY APPARATUS

BACKGROUND OF THE INVENTION

1. Field of the Invention

The present invention relates to an image display apparatus. More specifically, the present invention relates to an image display apparatus using a liquid crystal display panel displaying an image by controlling a polarization state of linearly polarized light.

2. Description of the Related Art

Liquid crystal display panels used in projection-type image display apparatuses are roughly classified into a transmission type and a reflection type.

Figure 6:
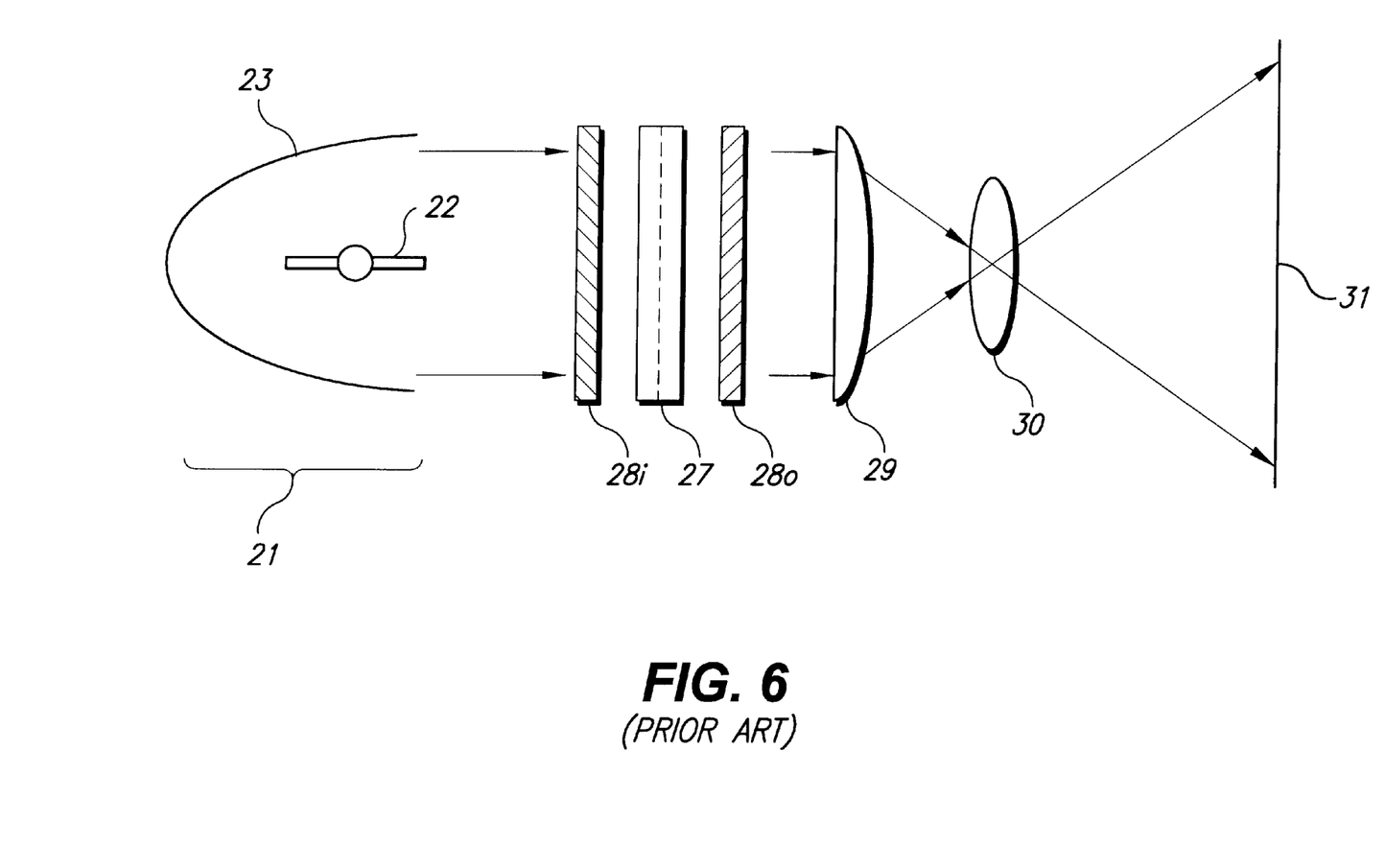
FIG. 6 schematically shows a conventional projection-type image display apparatus using a transmission-type liquid crystal display panel.

Referring to FIG. 6, a conventional projection-type image display apparatus using a transmission-type liquid crystal display panel will be described. The image display apparatus includes an illumination unit having a lamp 22 and a concave mirror 23, a transmission-type liquid crystal display panel 27, an input side polarizing plate $28_i$, an output side polarizing plate $28_o$, a field lens 29, a projection lens 30, and a screen 31.

A light beam from the illumination unit 21 is modulated by the liquid crystal display panel 27 through the polarizing plate $28_i$. Then, the light beam passes through the field lens 29 through the polarizing plate $28_o$, and is projected on the screen 31 by the projection lens 30. The liquid crystal display panel 27 is provided with the polarizing plate $28_i$ and the polarizing plate $28_o$ as polarization selecting elements on a light beam input side (the left side of the drawing) and a light beam output side (the right side of the drawing) in such a manner that their polarization axes are orthogonal to each other. An image is displayed by modulating the linearly polarized light by the liquid crystal display panel 27 so as to control its transmittance. In the case where an electrical field is not applied to a liquid crystal layer in the liquid crystal display panel 27, light transmitted through the polarizing plate $28_i$ is rotated (i.e., a plane of polarization is rotated) along a twist of liquid crystal molecules by an optical anisotropic effect of the liquid crystal molecules so as to be capable of passing through the polarizing plate $28_o$. Consequently, a bright display state (bright state) can be obtained. In the case where an electrical field is applied to the liquid crystal layer, the twist orientation of the liquid crystal molecules is cancelled, so that the liquid crystal layer does not rotate the plane of polarization. As a result, the light transmitted through the polarizing plate $28_i$ cannot pass through the polarizing plate $28_o$, being blocked by the polarizing plate $28_o$. Therefore, a dark display state (dark state) is obtained.

The ratio of brightness between a bright state and a dark state in the image display apparatus with the above-mentioned structure is called a contrast ratio. The contrast ratio is an important factor in an image display quality which largely depends upon a degree of polarization P of the two polarizing plates $28_i$ and $28_o$ for the following reason: the amount of transmitted light in the case of displaying a dark state largely depends upon the degree of polarization P of the polarizing plates $28_i$ and $28_o$; therefore, light is transmitted even in the case of displaying a dark state when the degree of polarization P is low; as a result, the contrast ratio decreases.

According to "Introduction to Optics II" (J. Tsujiuchi, Asakura Shoten, p. 203), the degree of polarization P is defined by Formula (1) using a total intensity $I_{tot}$ and a complete polarized light component $I_{pol}$ of a light beam transmitted through a polarizing plate:

$$P = I_{pol}/I_{tot} \tag{1}$$

According to "Polarizing-phase difference film for LCD" listed on pp. 53 to 55 in the August, 1995 issue of Monthly Display (Technotimes), the degree of polarization P of a polarizing plate tends to decrease with the increase in transmittance T of the polarizing plate. Therefore, increasing the transmittance T of the polarizing plate so as to realize a bright display in a liquid crystal display apparatus results in decreasing the degree of polarization P of the polarizing plate. This decreases a contrast ratio in the liquid crystal display apparatus. Thus, the transmittance T and the degree of polarization P of two polarizing plates $28_i$ and $28_o$ used in the projection-type image display apparatus using the transmission-type liquid crystal display panel is determined by the tradeoff of the brightness and the contrast ratio of a display. In general, the display quality remarkably decreases at a contrast ratio of less than 100:1, so that the degree of polarization P is required to be at least about 99%. In most cases, the polarization degrees of the polarizing plates $28_i$ and $28_o$ are at least about 99.9%.

Next, referring to FIG. 7, a conventional projection-type image display apparatus using a reflection-type liquid crystal display panel will be described. The image display apparatus includes an illumination unit 21 having a lamp 22 and a concave mirror 23, a polarizing plate $28_i$, a polarization beam splitter 32, a polarizing plate $28_o$, a reflection-type liquid crystal display panel 27', a field lens 29, a projection lens 30, and a screen 31. A light beam from the illumination unit 21 is incident upon the polarization beam splitter 32 through the polarizing plate $28_i$. A P-polarized light component of the light beam passes through the polarization beam splitter 32, and an S-polarized light component thereof is reflected in a side direction of the polarization beam splitter 32 to be incident upon the liquid crystal panel 27'. In the liquid crystal display panel 27', the S-polarized component has its plane of polarization optically modulated in the same way as in the above-mentioned transmission-type liquid crystal panel and is reflected. Thus, the P-polarized light component included in the reflected light can pass through the polarization beam splitter 32, and is projected on a screen 31 through the field lens 29 and the projection lens 30, whereby an image is displayed.

In the projection-type image display apparatus with the above-mentioned structure, the degree of polarization of the polarization beam splitter 32 with respect to a light beam reflected therefrom or transmitted therethrough largely influences the contrast ratio. However, even if the polarization beam splitter 32 has a degree of polarization of at least about 99% with respect to incident light (e.g., laser light) whose scattering angle is negligible, in an optical system of the projection-type image display apparatus, illumination light generally has a scattering angle of ± several degrees; therefore, the degree of polarization of the polarization beam splitter 32 is lower, compared with those of the polarizing plates $28_i$ and $28_o$. More specifically, since the transmittance of the P-polarized light component with respect to the polarization beam splitter 32 is about 95%, and that of the S-polarized light component is about 5%, the degree of polarization of the polarization beam splitter 32 is very low, i.e., about 95% in accordance with the above-mentioned Formula (1). As a result, in the projection-type image display apparatus with the above-mentioned structure, the contrast ratio is very low, i.e., 20:1. In order to solve this problem, the following attempt has been made: the polarizing plates $28_i$ and $28_o$ are provided as polarization selecting elements on an illumination unit side and a projection element side of the polarization beam splitter 32, and the degree of polarization of the combination of the polarizing plate $28_i$ and the polarization beam splitter 32 and that of the combination of the polarizing plate $28_o$ and the polarization beam splitter 32 are prescribed to be at least about 99%, whereby a contrast ratio of at least 100:1 is achieved.

However, in the projection-type image display apparatus using the transmission-type liquid crystal display panel as shown in FIG. 6, an effective component of the illumination light which can be used by the transmission-type liquid crystal display panel 27 is limited to that along a polarization axis of the polarizing plate $28_i$. The component which cannot pass through the transmission-type liquid crystal display panel 27 is absorbed by the polarizing plate $28_i$ and converted into heat. Therefore, the use efficiency of light becomes ½ or less. As a result, a bright display cannot be obtained in such a projection-type image display apparatus. Furthermore, due to the heat absorption by the polarizing plate $28_i$, the characteristics of the polarizing plate $28_i$ are degraded and the temperature of the liquid crystal layer in the liquid crystal display panel 27 is increased to phase-change a liquid crystal material included therein. Thus, display characteristics are degraded.

Figure 7:
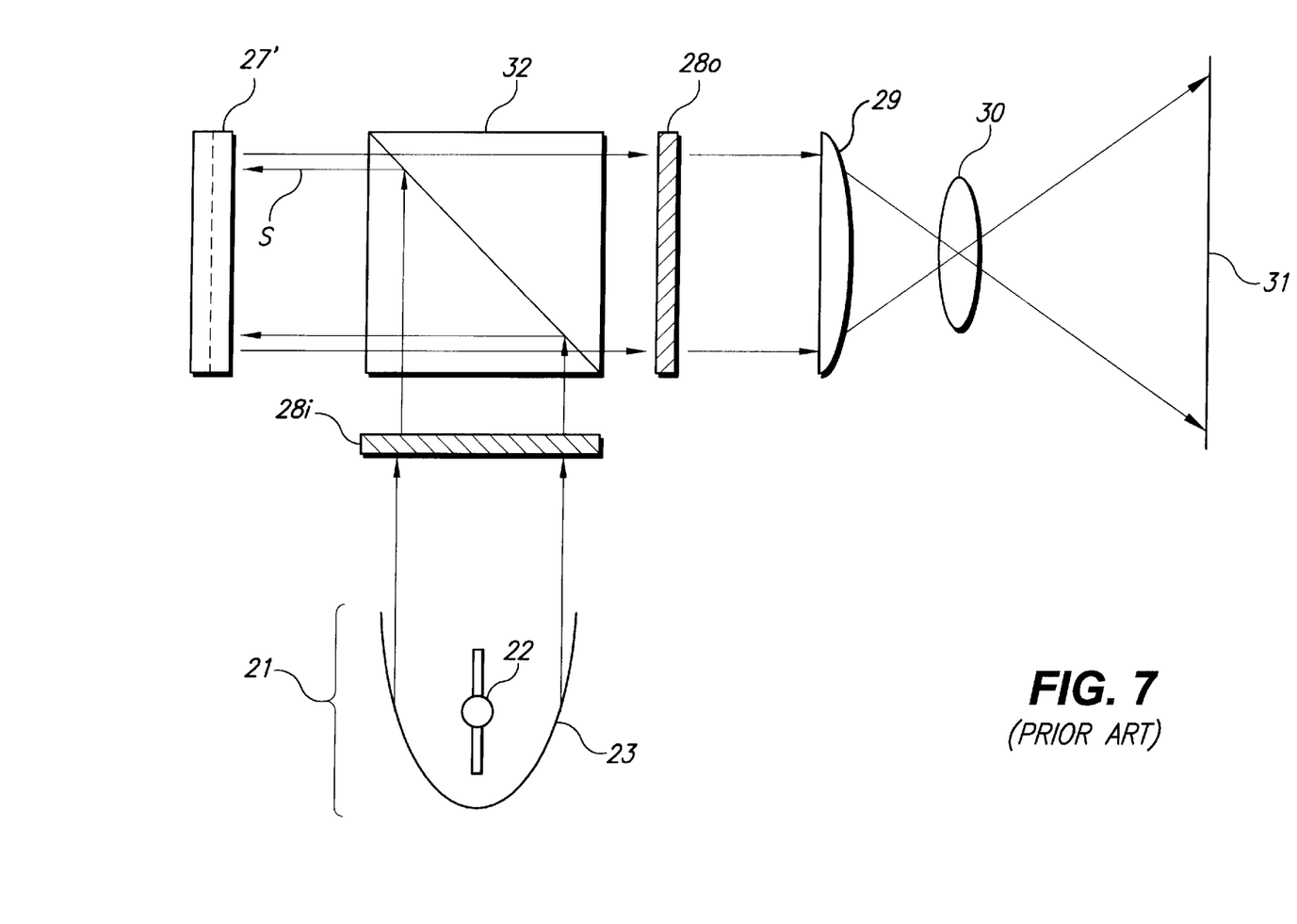
FIG. 7 schematically shows a conventional projection-type image display apparatus using a reflection-type liquid crystal display panel.

Likewise, in the projection-type image display apparatus using the reflection-type liquid crystal display panel as shown in FIG. 7, the polarizing plate $28_i$ on the illumination unit side of the polarization beam splitter 32 transmits only linearly polarized light along its polarization axis and converts the other component into heat which it absorbs. Therefore, the use efficiency of light becomes ½ or less. Furthermore, due to the heat absorption by the polarizing plate $28_i$, the characteristics of the polarizing plate $28_i$ are degraded and the temperature of the liquid crystal layer in the liquid crystal panel 27' is increased to phase-change a liquid crystal material included therein. Thus, display characteristics are degraded.

Figure 8:
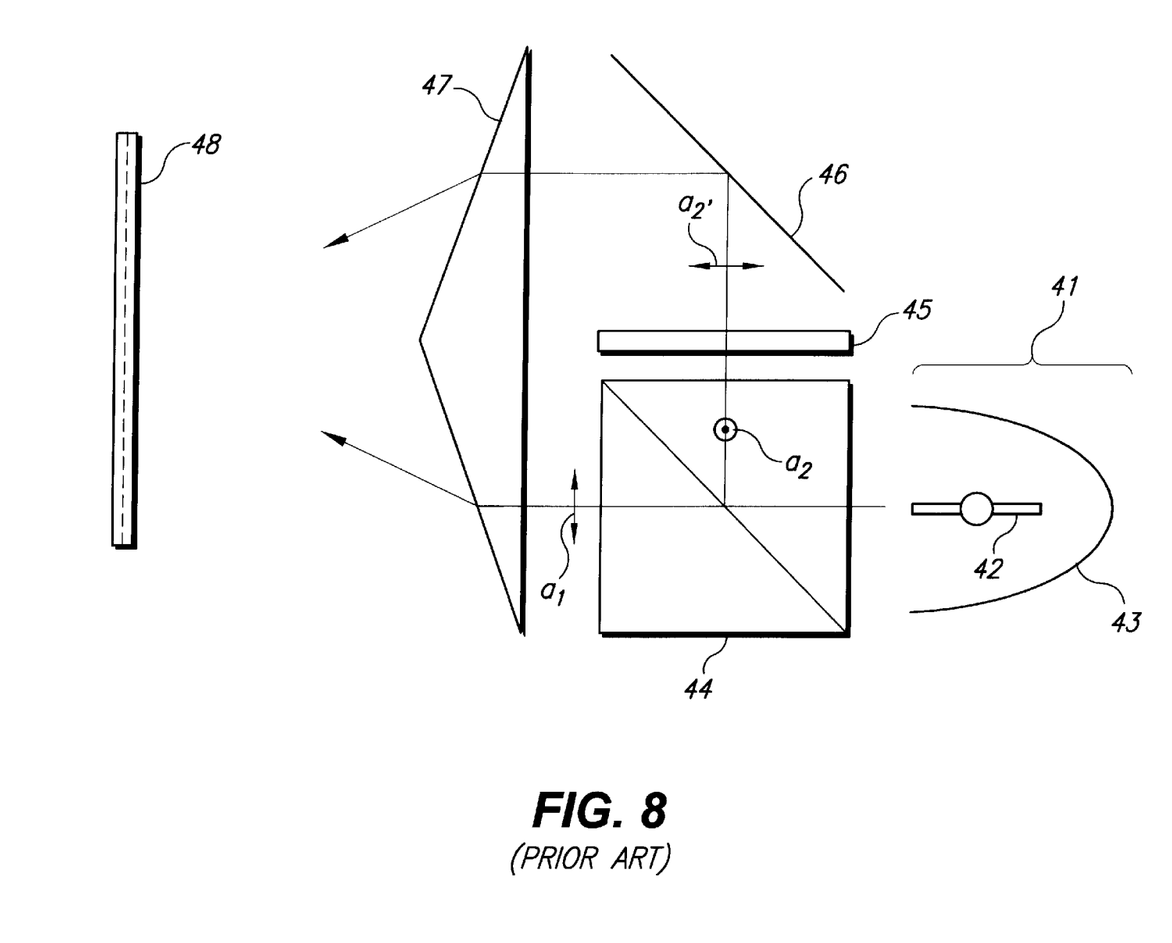
FIG. 8 schematically shows a conventional projection-type image display apparatus using a polarization beam splitter.

In order to solve the above-mentioned problems, the following techniques have been proposed. For example, Japanese Laid-open Publication No. 4-178683 describes a liquid crystal display apparatus (projection-type image display apparatus) in which a component of illumination light from an illumination unit which cannot pass through an input side polarizing plate is converted into polarized light which can pass through the input side polarizing plate by a polarization separating element and a polarization rotating element. A polarization converting optical system of the liquid crystal display apparatus described in this publication is shown in FIG. 8. As shown in FIG. 8, the polarization converting optical system includes an illumination unit 41 having a lamp 42 and a concave mirror 43, a cube-shaped polarization beam splitter 44, a polarization rotating element 45, a reflector 46, a prism 47, and a transmission-type liquid crystal display panel 48.

The polarization beam splitter 44 transmits a particular polarized light component (P-polarized light $a_1$ in FIG. 8) and reflects a polarized component orthogonal thereto (S-polarized light $a_2$ in FIG. 8) in a side direction of the polarization beam splitter 44, thereby splitting the light beam. Thus, white random light emitted from the illumination unit 41 is split into the P-polarized light $a_1$ and the S-polarized light $a_2$ by the polarization beam splitter 44. The P-polarized light $a_1$ transmitted through the polarization beam splitter 44 is incident upon the prism 47 as it is. The S-polarized light $a_2$ reflected in the side direction passes through the polarization rotating element 45, thereby having its plane of polarization rotated by 90°.

Thus, the plane of polarization of the S-polarized light $a_2$ is aligned with the same direction as that of the P-polarized light $a_1$ (i.e., direction parallel to the drawing surface) to become P-polarized light $a_2'$. Thereafter, the P-polarized light $a_2'$ is reflected by the reflector 46 and is incident upon the prism 47. Then, two light beams of the P-polarized light $a_1$ and the P-polarized light $a_2'$ are combined by the prism 47 and radiated to the transmission-type liquid crystal display panel 48. In this way, according to the structure described in the above-mentioned publication, two light beams of the P-polarized light $a_1$ and the S-polarized light $a_2$ are radiated to the transmission-type liquid crystal display panel 48 with their planes of polarization being alighted, whereby the use efficiency of light is improved, and the increase in temperature and the decrease in display characteristics of the transmission-type liquid crystal display panel 48 are minimized.

Figure 9:
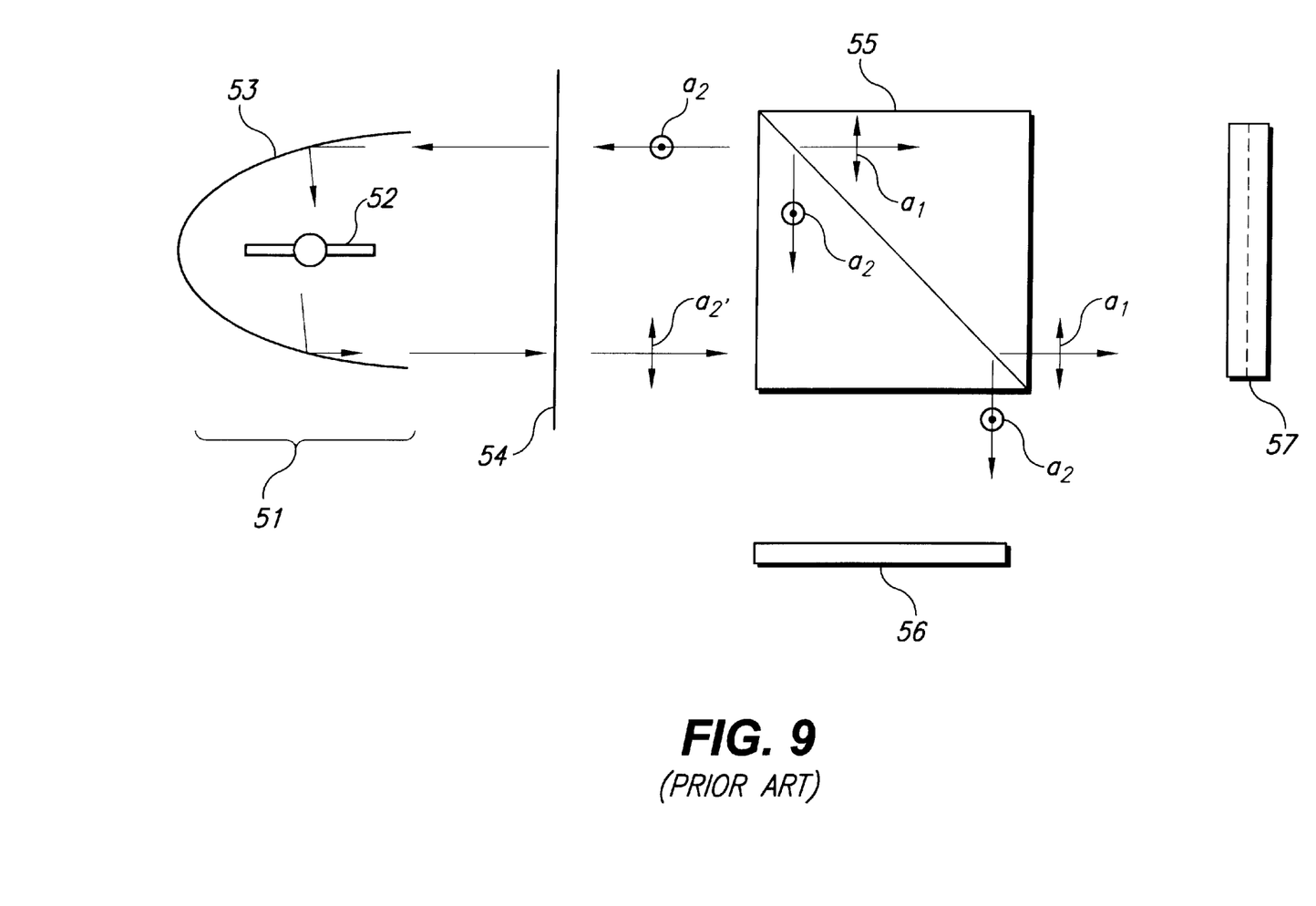
FIG. 9 schematically shows another conventional projection-type image display apparatus using a polarization beam splitter.

Japanese Laid-open Publication No. 2-93580 describes a projection-type image display apparatus as shown in FIG. 9. The projection-type image display apparatus includes a reflector 56 on a surface of a polarization beam splitter 55 orthogonal to a transmission-type liquid crystal display panel 57, and a quarter-wave plate 54 which is a polarization rotating element disposed between an illumination unit 51 irradiating a parallel light beam and the polarization beam splitter 55. With this structure, the technique described in the publication contemplates that all the components of the light beam from the illumination unit 51 are radiated to the transmission-type liquid crystal display panel 57. In the optical system shown in FIG. 9, the polarization beam splitter 55 transmits P-polarized light $a_1$ and reflects S-polarized light $a_2$ in a side direction, thereby splitting white random light emitted from the illumination unit 51. The reflected S-polarized light $a_2$ is reflected by the reflector 56 and reflected again by the polarization beam splitter 55. Then, the S-polarized light $a_2$ travels back to the illumination unit 51, is further reflected by a concave mirror 53 of the illumination unit 51 twice, and is incident upon the polarization beam splitter 55.

During the above-mentioned process, the polarization state of the S-polarized light $a_2$ changes as follows. When returning to the concave mirror 53 of the illumination unit 51 from the polarization beam splitter 55, the S-polarized light $a_2$ passes through the quarter-wave plate 54 to become circularly polarized light. Then, the circularly polarized light passes through the quarter-wave plate 54 to become P-polarized light $a_2'$, thereby having its plane of polarization aligned with the P-polarized light $a_1$. Accordingly, the S-polarized light $a_2$ is re-used, so that the amount of light which can be used by the transmission-type liquid crystal display panel 57 increases, and the increase in temperature of the liquid crystal layer and the decrease in display characteristics can be minimized.

Figure 10:
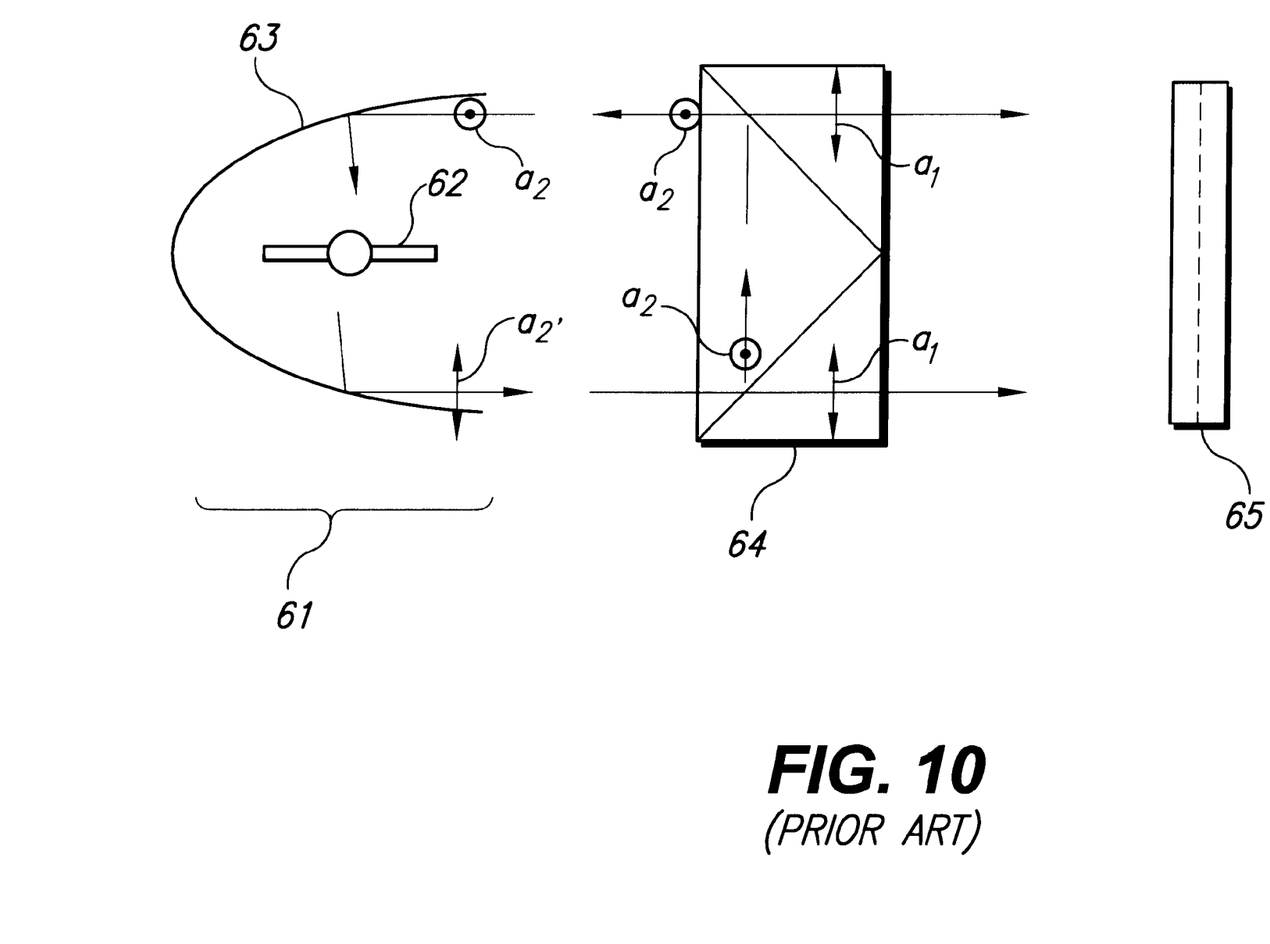
FIG. 10 schematically shows still another conventional projection-type image display apparatus using a polarization beam splitter.

Japanese Laid-open Publication No. 4-127120 describes a polarization converting optical system not using a polarization rotating element. The structure of the optical system is shown in FIG. 10. The optical system includes a polarization beam splitter 64 between an illumination unit 61 irradiating a parallel light beam and a transmission-type liquid crystal display panel 65. The polarization beam splitter 64 transmits P-polarized light $a_1$ of white random light from the illumination unit 61 and reflects S-polarized light $a_2$ thereof to the illumination unit 61. The S-polarized light $a_2$ reflected from the polarization beam splitter 64 is reflected by a concave mirror 63 twice and is incident upon the polarization beam splitter 64. At this time, depending upon the positions at which the S-polarized light $a_2$ is reflected in a cross-section of the concave mirror 63, linearly polarized light having a different polarization axis (i.e., P-polarized light $a_2'$) is generated. Thus, the P-polarized light $a_1$ and $a_2'$ pass through the polarization beam splitter 64 to be radiated to the transmission-type liquid crystal display panel 65. Therefore, the use efficiency of light is improved and the heat generation of the liquid crystal layer and the degradation of the display characteristics are minimized.

However, the above-mentioned techniques have respective problems which will be described below.

According to the technique (FIG. 8) described in Japanese Laid-open Publication No. 4-178683, the liquid crystal display panel 48 is irradiated with light beams from two directions, so that the-incident angle of illumination light becomes large and the optical system itself becomes large. When the incident angle of the illumination light becomes large, the aperture of the projection lens of the projection unit should be enlarged. Furthermore, the number of components such as the polarization beam splitter 44, the polarization rotating element 45, and the like increases. This causes the apparatus to be enlarged and the cost to be increased.

According to the technique (FIG. 9) described in Japanese Laid-open Publication No. 2-93580, the polarization beam splitter 55, the reflector 56, and the quarter-wave plate 54 are required to be provided. Therefore, the technique shown in FIG. 9 also has the problem that the apparatus is enlarged, and the cost is increased in the same way as in the technique described in Japanese Laid-open Publication No. 4-178683. In addition, because of the absorption and reflection of illumination light by the quarter-wave plate 54, the loss of the illumination-light is caused. Furthermore, since the quarter-wave plate 54 is disposed close to the illumination unit 51, the characteristics of the quarter-wave plate 54 are degraded by the heat of the illumination unit 51.

The technique (FIG. 10) described in Japanese Laid-open Publication No. 4-127120 also has the problem that the apparatus is enlarged and the cost is increased because of the presence of the polarization beam splitter 64. Furthermore, a discontinuous portion is present in a polarization separating film of the polarization beam splitter 64. It is very difficult to uniformly form the polarization separating film in the discontinuous portion. This changes the polarization separation characteristics, resulting in display inconsistency.

As described above, there has been a demand for a miniaturized and light-weight projection-type image display apparatus which has outstanding use efficiency of light from an illumination unit, enables a bright image with a high contrast to be obtained, has an outstanding display quality, and is produced at low cost.

SUMMARY OF THE INVENTION

A projection-type image display apparatus of the present invention includes: an illumination unit; a polarization selecting and reflecting element which splits a light beam from the illumination unit into a first light beam and a second light beam having polarization states different from each other, reflects the first light beam to the illumination unit, and outputs the second light beam as linearly polarized light; a transmission-type liquid crystal display panel which controls a polarization state of the linearly polarized light and displays an image; a first polarization selecting element and a second polarization selecting element respectively provided on a light beam input side and a light beam output side of the transmission-type liquid crystal display panel; and a projection element which projects the image displayed by the transmission-type liquid crystal display panel, wherein a combination of the polarization selecting and reflecting element and the first polarization selecting element has a degree of polarization of at least about 99%, and at least one of the polarization selecting and reflecting element and the first polarization selecting element has a degree of polarization of less than about 99%.

In one embodiment of the present invention, the polarization selecting and reflecting element is a circularly polarized light selecting and reflecting element which splits a light beam into first circularly polarized light and second circularly polarized light having rotation directions different from each other, reflects the first circularly polarized light, and converts the second circularly polarized light into linearly polarized light and outputs the linearly polarized light.

In another embodiment of the present invention, the polarization selecting and reflecting element is a linearly polarized light selecting and reflecting element which splits a light beam into first linearly polarized light and second linearly polarized light having polarization axes different from each other by 90°, reflects the first linearly polarized light, and transmits the second linearly polarized light.

A projection-type image display apparatus of the present invention includes: an illumination unit; a polarization selecting and reflecting element which splits a light beam from the illumination unit into a first light beam and a second light beam having polarization states different from each other, reflects the first light beam to the illumination unit, and outputs the second light beam as linearly polarized light; a polarization beam splitter upon which the linearly polarized light is incident; a reflection-type liquid crystal display panel which controls a polarization state of the linearly polarized light incident through the polarization beam splitter and displays an image; and a projection element which projects the image displayed by the reflection-type liquid crystal display panel, wherein a combination of the polarization selecting and reflecting element and the polarization beam splitter has a degree of polarization of at least about 99%, and at least one of the polarization selecting and reflecting element and the polarization beam splitter has a degree of polarization of less than about 99%.

In one embodiment of the present invention, the polarization selecting and reflecting element is a circularly polarized light selecting and reflecting element which splits a light beam into first circularly polarized light and second circularly polarized light having rotation directions different from each other, reflects the first circularly polarized light, and converts the second circularly polarized light into linearly polarized light and outputs the linearly polarized light.

In another embodiment of the present invention, the polarization selecting and reflecting element is a linearly polarized light selecting and reflecting element which splits a light beam into first linearly polarized light and second linearly polarized light having polarization axes different from each other by 90°, reflects the first linearly polarized light, and transmits the second linearly polarized light.

In another embodiment of the present invention, the above-mentioned projection-type image display apparatus further includes a polarization selecting element between the polarization selecting and reflecting element and the polarization beam splitter.

Thus, the invention described herein makes possible the advantage of providing a miniaturized and light-weight projection-type image display apparatus which has outstanding use efficiency of light from an illumination unit, enables a bright image with a high contrast to be obtained, has an outstanding display quality, and is produced at low cost.

This and other advantages of the present invention will become apparent to those skilled in the art upon reading and understanding the following detailed description with reference to the accompanying Figures.

DESCRIPTION OF THE PREFERRED EMBODIMENTS

Hereinafter, the present invention will be described by way of illustrative embodiments with reference to the drawings. It should be noted the present invention is not limited thereto. For simplicity, a projection-type image display apparatus will be described, although the present invention is also applicable to a direct-view type image display apparatus.

EMBODIMENT 1

Figure 1:
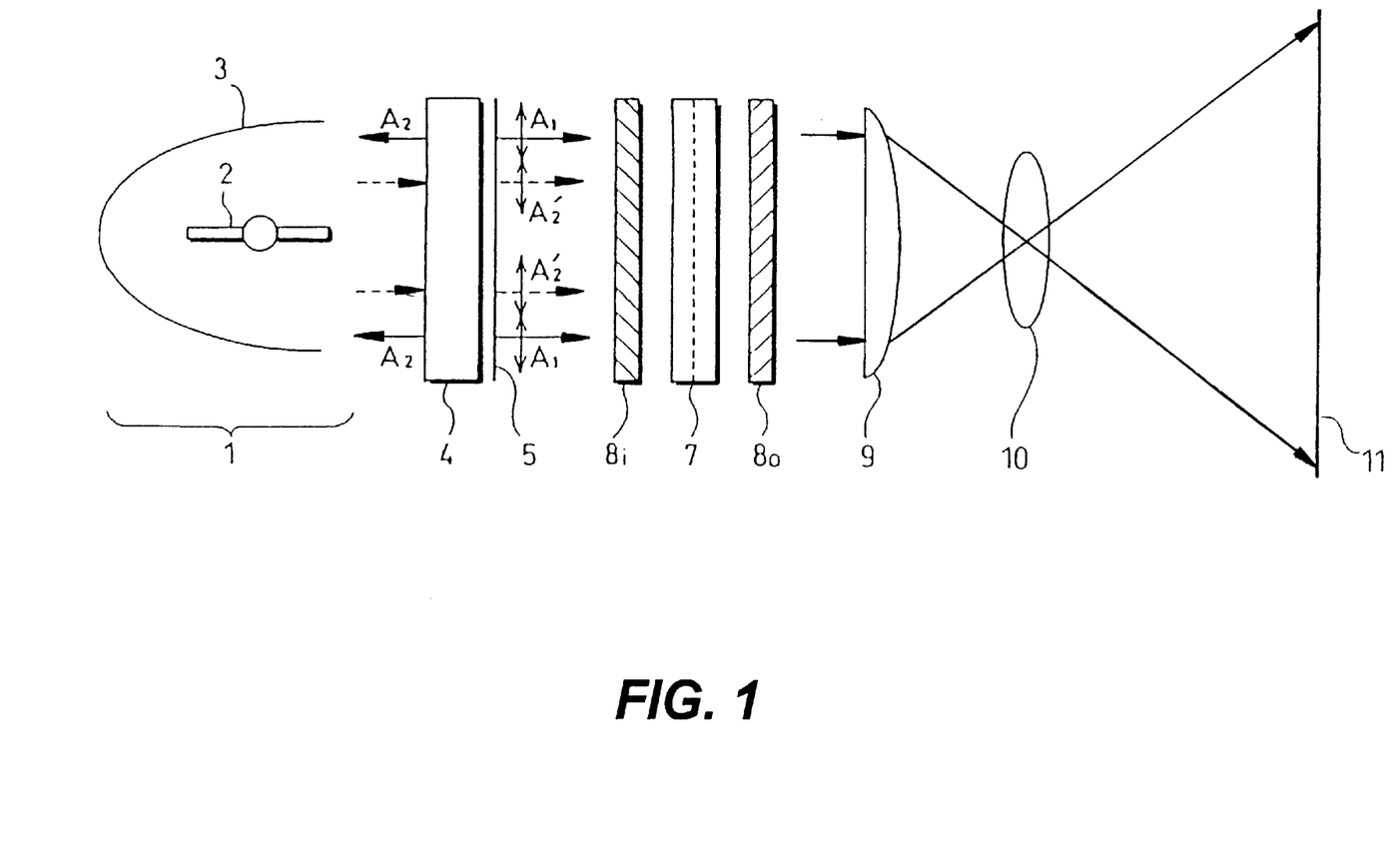
FIG. 1 schematically shows a projection-type image display apparatus in an embodiment of the present invention.

Referring to FIGS. 1 through 4B, a projection-type image display apparatus in a preferred embodiment of the present invention will be described. FIG. 1 schematically shows the projection-type image display apparatus. The projection-type image display apparatus includes: an illumination unit 1 having a lamp 2 and a parabolic mirror (concave mirror) 3; a polarization selecting and reflecting element (e.g., circularly polarized light selecting and reflecting element) having a cholesteric polarizer 4 and a quarter-wave plate 5; a transmission-type liquid crystal display panel 7 displaying an image by modulating the polarization state of linearly polarized light based on an applied voltage to control transmittance; a polarizing plate $8_i$ which is a first polarization selecting element provided on a light beam input side of the liquid crystal display panel 7; a polarizing plate $8_o$ which is a second polarization selecting element provided on a light beam output side of the liquid crystal display panel 7; a projection element having a field lens 9 and a projection lens 10; and a screen 11. A light beam having been controlled by the liquid crystal display panel 7 passes through the field lens 9 and is projected on the screen 11 under magnification by the projection lens 10.

The combination of the polarization selecting and reflecting element (including the cholesteric polarizer 4 and the quarter-wave plate 5) and the first polarization selecting element (polarizing plate $8_i$) has a degree of polarization of at least about 99%, and at least one of the polarization selecting and reflecting element and the first polarization selecting element has a degree of polarization of less than about 99%. The polarization selecting and reflecting element splits a light beam emitted from the illumination unit 1 into a first light beam and a second light beam having different polarization states, reflects the first light beam to the illumination unit 1, and outputs the second light beam as linearly polarized light.

The illumination unit 1 outputs an almost parallel light beam due to the combination of the lamp 2 and the parabolic mirror (concave mirror) 3. As the lamp 2, for example, a metal halide lamp, a halogen lamp, or a xenon lamp is used.

In one embodiment, the polarization selecting and reflecting element is a circularly polarized light selecting and reflecting element. More specifically, the polarization selecting and reflecting element splits a light beam into a first circularly polarized light and a second circularly polarized light having different rotation directions, reflects the first circularly polarized light, and converts the second circularly polarized light into linearly polarized light and outputs it. The cholesteric polarizer 4 of the polarization selecting and reflecting element has an optically active layer containing a cholesteric (chiral nematic) material, which reflects a polarized light component as a result of interaction with the direction and pitch of a spiral structure of chiral molecules and transmits the remaining component. The transmitted polarized light component (circularly polarized light component in the present embodiment) is converted into linearly polarized light to be output by the quarter-wave plate 5 (this type of cholesteric polarizer is described in Japanese Laid-open Publication No. 6-281814.)

According to the above-mentioned structure, of the light beam which is irradiated onto the cholesteric polarizer 4 by the illumination unit 1, a polarized light component as a result of interaction with the direction and pitch of a spiral structure of chiral molecules is reflected (light beam $A_2$) by the optically active layer of the cholesteric polarizer 4, and the remaining polarized light component is transmitted therethrough. The light transmitted through the cholesteric polarizer 4 is circularly polarized light. The transmitted circularly polarized light is converted into linearly polarized light by passing through the quarter-wave plate 5 and is incident upon the liquid crystal panel 7 (light beam $A_1$). In the present embodiment, the direction of the polarization axis of linearly polarized light output from the cholesteric polarizer 4 is aligned with the direction of the polarization axis of the polarizing plate $8_i$ disposed on a light beam input side of the liquid crystal display panel 7.

Furthermore, the polarized light component as a result of interaction with the direction and pitch of a spiral structure of chiral molecules included in the optically active layer of the cholesteric polarizer 4 is reflected by the polarization selecting and reflecting element as the light beam $A_2$. This prevents the degradation of the characteristics of the polarizing plate $8_i$ and the decrease in a display quality due to the increase in temperature of a liquid crystal layer of the transmission-type liquid crystal display panel 7, caused by the light absorption and heat conversion by the polarizing plate $8_i$. Furthermore, the illumination unit 1 to which the reflected light beam $A_2$ travels is provided with the parabolic mirror 3, so that the light beam $A_2$ is further reflected by the parabolic mirror 3 and is incident upon the cholesteric polarizer 4. During this process, a portion of the light beam $A_2$ has its plane of polarization altered, whereby a light beam $A_2'$ is output from the polarization selecting and reflecting element and contributes to a display. As a result, it was confirmed that the use efficiency of light was improved by about 15%.

According to the present invention, as the polarization selecting and reflecting element, those other than the circularly polarized light selecting and reflecting element can be used. For example, a linearly polarized light selecting and reflecting element (e.g., a retroreflecting sheet polarizer) can be used, which splits a light beam into first linearly polarized light and second linearly polarized light having polarization axes different from each other by 90°, and which reflects the first linearly polarized light and transmits the second linearly polarized light. The retroreflecting sheet polarizer is a sheet-shaped polarization beam splitter in which a microprism array is coated with a dielectric layer (SID, 1992 Digest, p. 427). In the case of using such an element, the number of components and the cost can be reduced, compared with the case where a quarter-wave plate and a cholesteric element are used.

Next, a polarizing plate used for the input side polarizing plate $8_i$ in the present embodiment and the advantage thereof will be described. First, the problems of a conventional projection-type image display apparatus will be described.

Figure 2A:
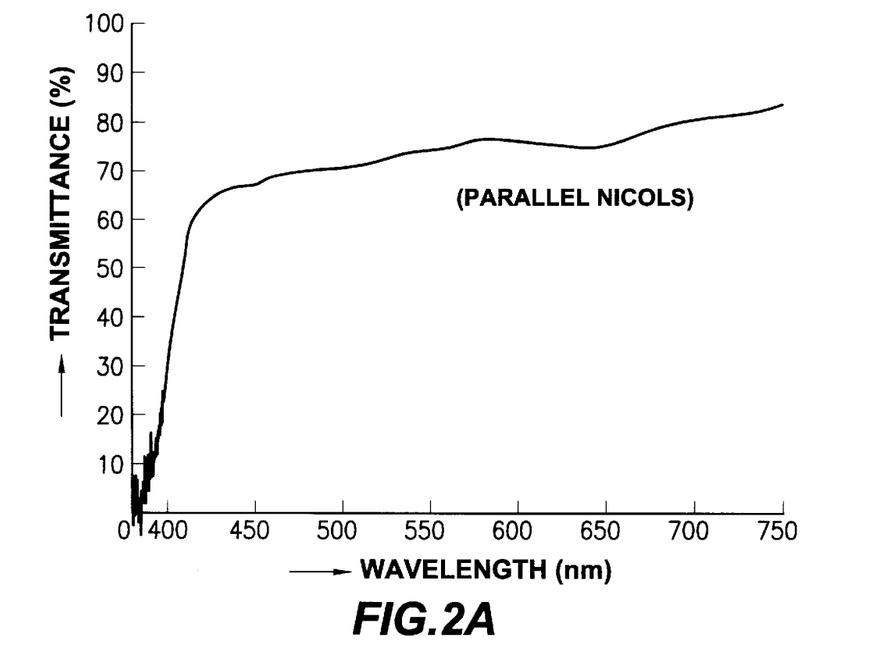
FIG. 2A is a graph showing the relationship between the transmittance and the wavelength when a polarizing plate α having transmittance T and a degree of polarization P and an output side polarizing plate are disposed in parallel Nicols in a conventional projection-type image display apparatus.
Figure 2B:
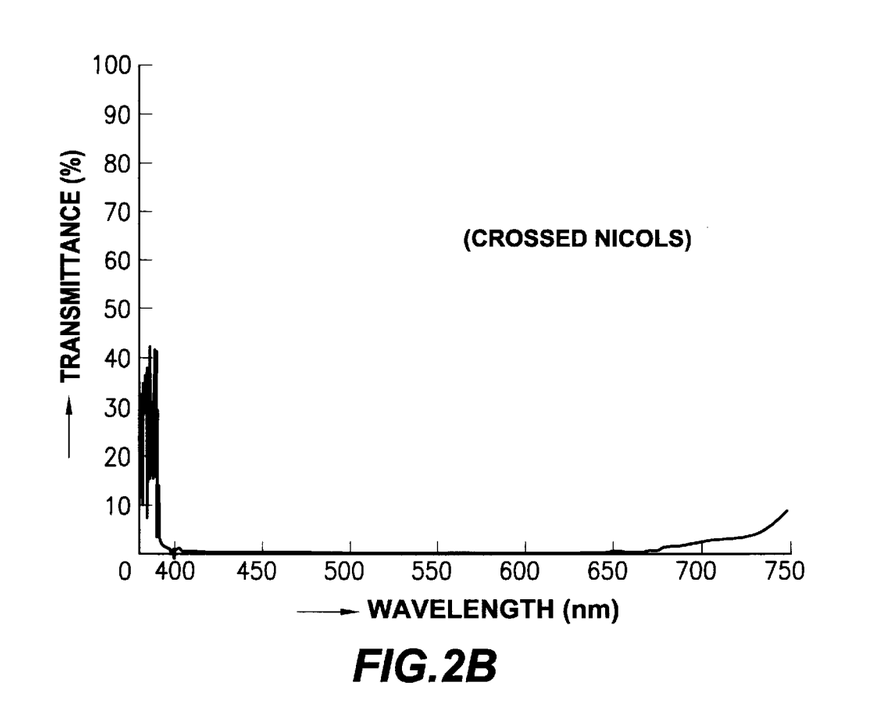
FIG. 2B is a graph showing the relationship between the transmittance and the wavelength when the polarizing plate α having transmittance T and a degree of polarization P and the output side polarizing plate are disposed in crossed Nicols in the conventional projection-type image display apparatus.

As described above, with the polarizing plate used for the input side polarizing plate $28_i$ of the transmission-type liquid crystal display panel 27 in the conventional projection-type image display apparatus as shown in FIG. 6, the transmittance T and the degree of polarization P are determined in light of the contrast ratio of a display. This polarizing plate (hereinafter, referred to as a "polarizing plate α") has characteristics, for example, as shown in FIGS. 2A and 2B. FIG. 2A shows the relationship between the transmittance (%) (vertical axis) and the wavelength (nm) (horizontal axis) when the polarizing plate α and the output side polarizing plate $28_o$ are disposed in parallel Nicols; FIG. 2B shows the relationship between the transmittance and the wavelength when the polarizing plate α and the output side polarizing plate $28_o$ are disposed in crossed Nicols. The transmittance is normalized with the transmittance of the output side polarizing plate $28_o$ alone being 100%. As is apparent from FIGS. 2A and 2B, the transmittance T is sufficiently low under crossed Nicols in a visible wavelength range. The contrast ratio in the polarizing plate α and the output side polarizing plate $28_o$ (ratio between the transmittance under parallel Nicols in FIG. 2A and the transmittance under crossed Nicols in FIG. 2B) is about 1400:1, and the contrast ratio in the projection-type image display apparatus using the polarizing plate α and the output side polarizing plate $28_o$ is about 300:1.

Next, the case where a polarizing plate β having transmittance $T_2$ ($T_2>T$) and a degree of polarization $P_2$ ($P_2<P$) is used as the input side polarizing plate $28_i$ of the conventional transmission-type liquid crystal display panel 27 in FIG. 6 will be described.

Figure 3A:
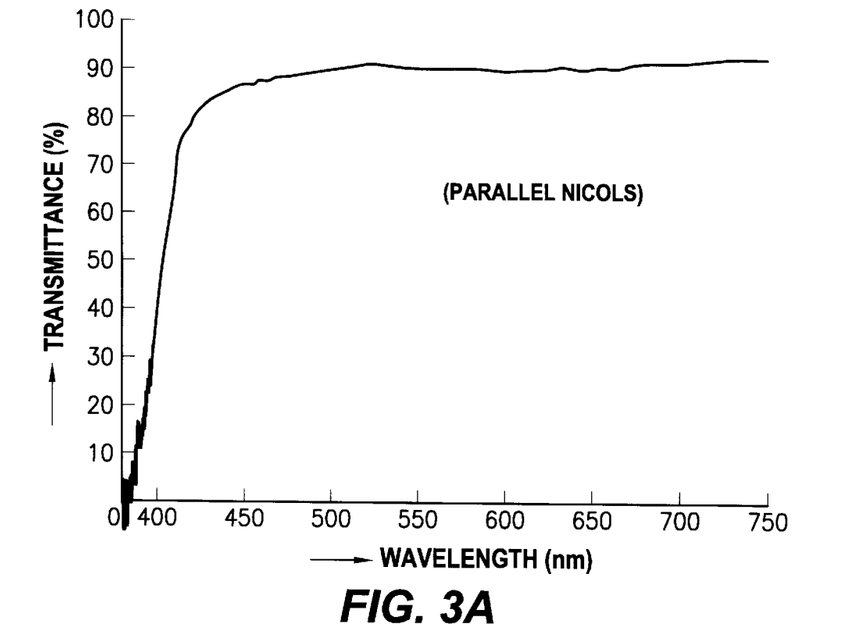
FIG. 3A is a graph showing the relationship between the transmittance and the wavelength when a polarizing plate β having transmittance $T_2$ ($T_2$>T) and a degree of polarization $P_2$ ($P_2$<P) and an output side polarizing plate are disposed in parallel Nicols in a conventional projection-type image display apparatus.
Figure 3B:
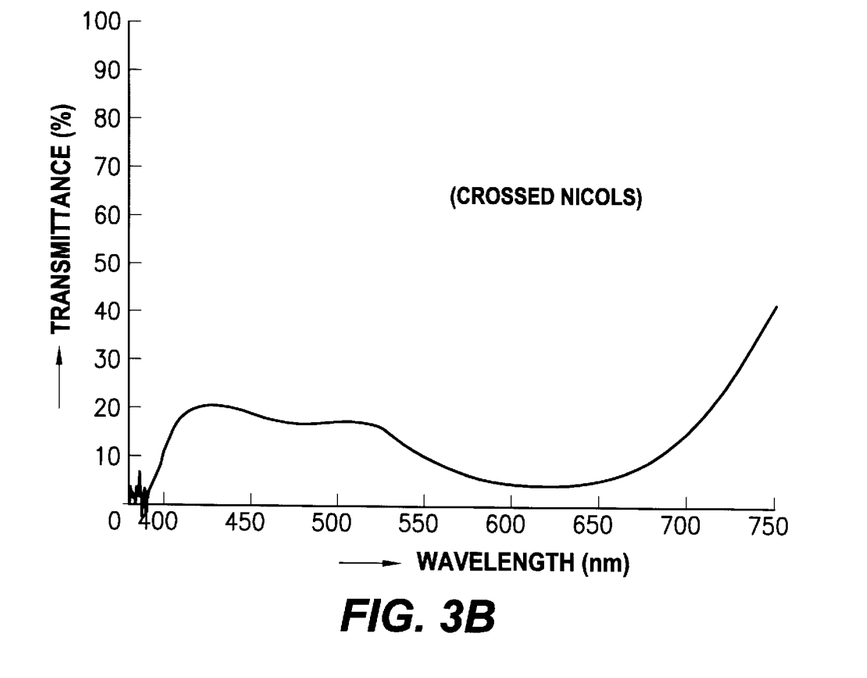
FIG. 3B is a graph showing the relationship between the transmittance and the wavelength when the polarizing plate β having a transmittance $T_2$ ($T_2$>T) and a degree of polarization $P_2$ ($P_2$<P) and the output side polarizing plate are disposed in crossed Nicols in the conventional projection-type image display apparatus.

FIG. 3A shows the relationship between the transmittance and the wavelength when the polarizing plate β and the output side polarizing plate $28_o$ are disposed in parallel Nicols; FIG. 3B shows the relationship between the transmittance and the wavelength when the polarizing plate β and the output side polarizing plate $28_o$ are disposed in crossed Nicols. In the same way as shown in FIGS. 2A and 2B, the transmittance is normalized with the transmittance of the output side polarizing plate $28_o$ alone being 100%. By comparing FIG. 2A with FIG. 3A, it may be understood that the transmittance under parallel Nicols is improved from about 75% to about 90% by changing the input side polarizing plate $28_i$ from the polarizing plate α to the polarizing plate β, whereby a bright display is obtained. However, comparing FIG. 2B with FIG. 3B, in the case of using the polarizing plate β, the transmittance under crossed Nicols is increased up to about 10%; as a result, even when the transmission-type liquid crystal display panel 7 displays a dark display, light is transmitted. The contrast ratio in the polarizing plate β and the output side polarizing plate $28_o$ is about 9:1. As a result, the contrast ratio in the projection-type image display apparatus using the polarizing plate β and the output side polarizing plate $28_o$ remarkably decreases. In this way, in the conventional projection-type image display apparatus, the brightness and the contrast ratio cannot be simultaneously improved.

Figure 4A:
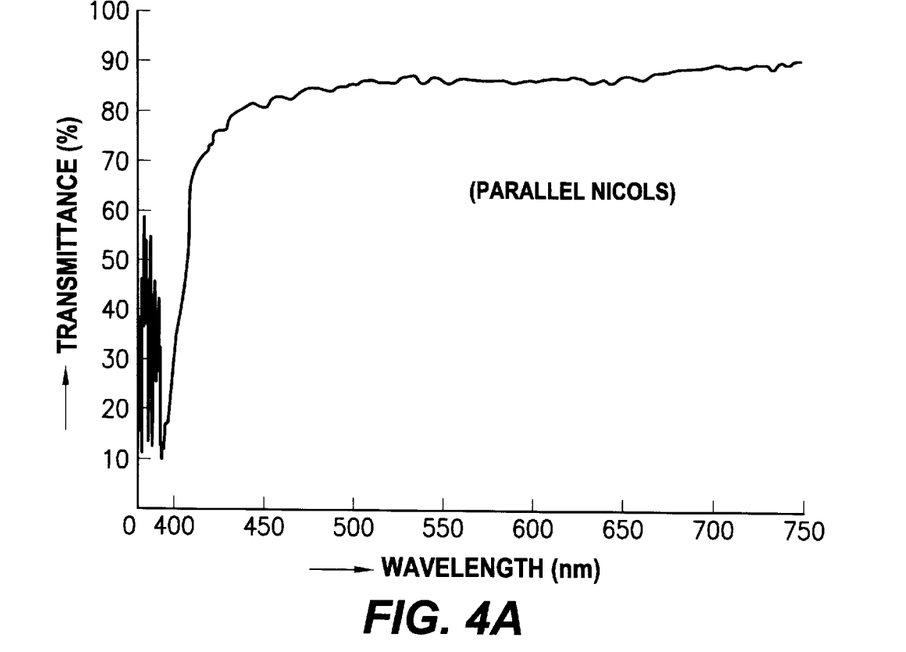
FIG. 4A is a graph showing the relationship between the transmittance and the wavelength when the combination of a polarizing plate β having transmittance $T_2$ ($T_2$>T) and a degree of polarization $P_2$ ($P_2$<P) and a polarization selecting and reflecting element and an output side polarizing plate are disposed in parallel Nicols in a projection-type image display apparatus in the embodiment of the present invention.
Figure 4B:
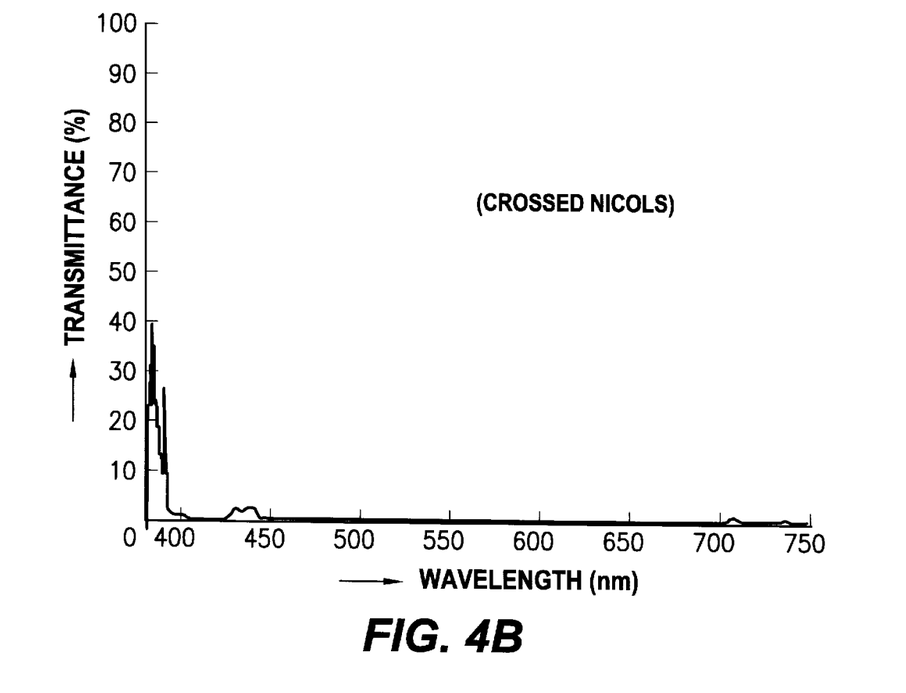
FIG. 4B is a graph showing the relationship between the transmittance and the wavelength when the combination of the polarizing plate β having transmittance $T_2$ ($T_2$>T) and a degree of polarization $P_2$ ($P_2$<P) and the polarization selecting and reflecting element and the output side polarizing plate are disposed in crossed Nicols in the projection-type image display apparatus in the embodiment of the present invention.

In contrast, in the present embodiment (e.g., the projection-type liquid crystal display apparatus in FIG. 1), the brightness and the contrast ratio can be simultaneously improved. Hereinafter, such a projection-type image display apparatus will be described in detail. In the present embodiment, the combination of the polarizing plate β and the polarization selecting and reflecting element (including the cholesteric polarizer 4 and the quarter-wave plate 5) is used. FIG. 4A shows the relationship between the transmittance and the wavelength when the combination of the polarizing plate β and the polarization selecting and reflecting element and the output side polarizing plate $8_o$ (which is identical to the polarizing plate $28_o$) are disposed in parallel Nicols; FIG. 4B shows the relationship between the transmittance and the wavelength when the combination of the polarizing plate β and the polarization selecting and reflecting element and the output side polarizing plate $8_o$ are disposed in crossed Nicols. As is apparent from FIG. 4A, in the present embodiment, the transmittance under parallel Nicols is about 85% which is higher than that shown in FIG. 2A, and the transmittance under crossed Nicols is as low as that in FIG. 2B. In the present embodiment, the contrast ratio in the combination of the polarizing plate β and the polarization selecting and reflecting element and the output side polarizing plate $8_o$ is about 1500:1. Thus, the projection-type image display apparatus of the present embodiment has an outstanding contrast ratio and brightness, compared with the conventional projection-type image display apparatus.

In the projection-type image display apparatus of the present embodiment, the combination of the polarizing plate $8_i$ and the polarization selecting and reflecting element (including the cholesteric polarizer 4 and the quarter-wave plate 5) is used, whereby the transmittance $T_1$ and the degree of polarization $P_1$ of the combination of the polarizing plate $8_i$ and the polarization selecting and reflecting element become $T_1 \leq T$ and $P_1 \leq P$ (i.e., the degree of polarization $P_1$ becomes at least about 99%), in spite of the fact that the degree of polarization $P_2$ of the polarizing plate $8_i$ is $P_2 < P$ (i.e., less than about 99%). As a result, a small-sized projection-type image display apparatus having outstanding brightness and contrast ratio is obtained. Actually, a projection-type image display apparatus having brightness about 1.3 times that of the conventional example was obtained. Herein, the case where the degree of polarization $P_2$ of the polarizing plate $8_i$ is less than about 99% has been described. However, the same effect can also be obtained even in the case where the degree of polarization of the polarization selecting and reflecting element is less than about 99%, as long as the degree of polarization of the combination of the polarizing plate $8_i$ and the polarization selecting and reflecting element is at least about 99%. Furthermore, in the present embodiment, a light beam which is absorbed by the input side polarizing plate $28_i$ in the conventional projection-type image display apparatus is reflected by the polarization selecting and reflecting element. This prevents the degradation of the characteristics of the polarizing plate $8_i$ and the decrease in display quality due to the increase in temperature of the liquid crystal layer in the transmission-type liquid crystal display panel 7, caused by the light absorption and heat conversion by the polarizing plate $8_i$, whereby reliability can be improved.

EMBODIMENT 2

Figure 5:
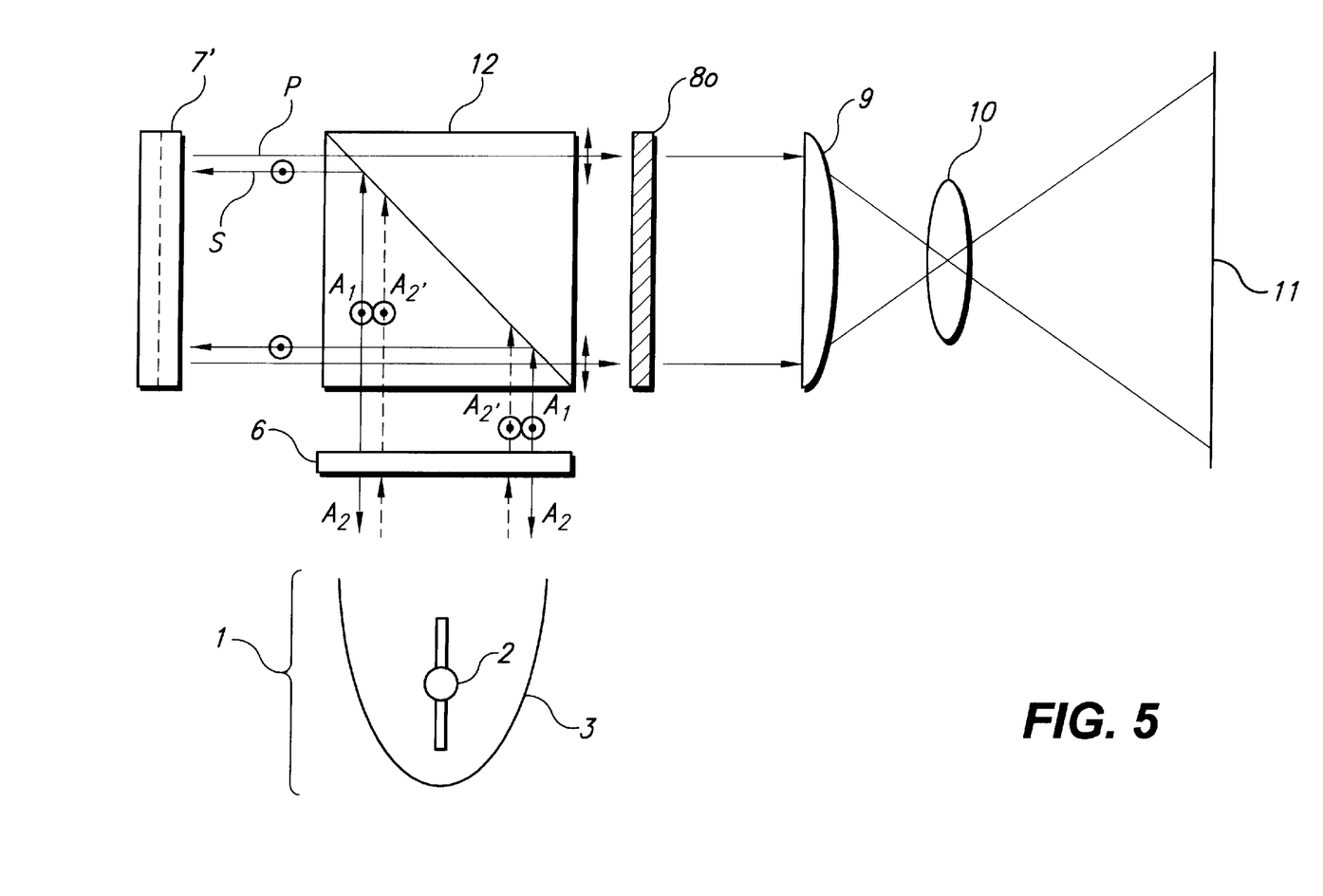
FIG. 5 schematically shows a projection-type image display apparatus in another embodiment of the present invention.

Referring to FIG. 5, a projection-type image display apparatus in another embodiment of the present invention will be described. FIG. 5 is a schematic view showing the projection-type image display apparatus. In FIG. 5, the components identical with those in Embodiment 1 are denoted by the reference numerals identical therewith, and the detailed description of these will be omitted.

The projection-type image display apparatus includes an illumination unit having a lamp 2 and a parabolic mirror (concave mirror) 3, a polarization selecting and reflecting element 6 (e.g., a retroreflecting sheet polarizer), a reflection-type liquid crystal display panel 7' displaying an image by modulating a polarization state of linearly polarized light based on an applied voltage to control transmittance, a polarization beam splitter 12, a polarizing plate $8_o$ provided on a light beam output side of the polarization beam splitter 12, a projection element having a field lens 9 and a projection lens 10, and a screen 11. The degree of polarization of the combination of the retroreflecting sheet polarizer 6 and the polarization beam splitter 12 is at least about 99%, and the degree of polarization of at least one of the retroreflecting sheet polarizer 6 and the polarization beam splitter 12 is less than about 99%. The retroreflecting sheet polarizer 6 is a linearly polarized light selecting and reflecting element; however, a circularly polarized light selecting and reflecting element can also be used.

According to the above-mentioned structure, of a light beam emitted from the illumination unit 1, linearly polarized light (i.e., S-polarized light) which is incident upon the reflection-type liquid crystal display panel 7' through the retroreflecting sheet polarizer 6 and the polarization beam splitter 12 is modulated by a liquid crystal layer to become a light beam containing a P-polarized light component and reflected to the polarization beam splitter 12. The P-polarized light transmitted through the polarization beam splitter 12 passes through the field lens 9 and is projected on the screen 11 under magnification by the projection lens 10, whereby an image is displayed. More specifically, according to the above-mentioned structure, a light beam emitted from the illumination unit 1 is split into first linearly polarized light (light beam $A_1$) and second linearly polarized light (light beam $A_2$) having polarization axes different from each other by 90°. The light beam $A_1$ passes through the retroreflecting sheet polarizer 6, and the light beam $A_2$ is reflected by the retroreflecting sheet polarizer 6. The light beam $A_1$ transmitted through the retroreflecting sheet polarizer 6 is reflected by the polarization beam splitter 12 and incident upon the reflection-type liquid crystal display panel 7'. In the present embodiment, the polarization axis of the light beam $A_1$ is aligned with the polarization axis of linearly polarized light reflected by the polarization beam splitter 12.

The polarization beam splitter 12 in a wide band range has a degree of polarization of about 95% and a contrast ratio of about 20:1. However, in the present embodiment, the use of the combination of the polarization beam splitter 12 and the retroreflecting sheet polarizer 6 enables the degree of polarization of the combination to be at least about 99%. As a result, a projection-type image display apparatus with a contrast ratio of about 300:1 can be obtained. Furthermore, in the present embodiment, the following advantage is obtained. In the conventional projection-type image display apparatus as shown in FIG. 7, the light beam $A_2$ is absorbed and converted into heat by the polarizing plate $28_i$ provided on the illumination unit side of the polarization beam splitter 32. Therefore, the characteristics of the polarizing plate $28_i$ are degraded, and the display quality is decreased due to the increase in temperature of the liquid crystal layer in the reflection-type liquid crystal display panel 27'. In contrast, in the present embodiment, the light beam $A_2$ is reflected by the retroreflecting sheet polarizer 6. This prevents the decrease in display quality due to the temperature increase and the degradation of the characteristics of the polarizing plate $8_i$, caused by light absorption.

Furthermore, in the present embodiment, the illumination unit 1 is provided with the parabolic mirror 3, so that the light beam $A_2$ is further reflected by the parabolic mirror 3 and incident upon the retroreflecting sheet polarizer 6. During this process, the light beam $A_2$ has its plane of polarization altered, whereby the light beam $A_2'$ is output from the retroreflecting sheet polarizer 6 and contributes to a display. As a result, it was confirmed that the use efficiency of light was improved by about 15%.

If required, any appropriate polarization selecting element (not shown) can be provided between the retroreflecting sheet polarizer 6 and the polarization beam splitter 12. As a result, the contrast ratio can be further improved.

In the projection-type image display apparatus of the present embodiment, the combination of the polarization beam splitter 12 and the retroreflecting sheet polarizer 6 is used, whereby the degree of polarization of the combination can be made at least about 99%, in spite of the fact that each degree of polarization is less than about 99%. As a result, a small-sized projection-type image display apparatus having outstanding brightness and contrast ratio can be obtained. Actually, a projection-type image display apparatus which is about 1.3 times as bright as the conventional projection-type image display apparatus and has a contrast ratio of at least 100:1 can be obtained.

According to the present invention, in the projection-type image display apparatus including a transmission-type liquid crystal display panel, the degree of polarization of the combination of the polarization selecting and reflecting element and the first polarization selecting element provided on the light beam input side of the transmission-type liquid crystal display panel is at least about 99%. According to the present invention, a polarized component which is absorbed and converted into heat by the first polarization selecting element in the conventional projection-type image display apparatus is reflected by the polarization selecting and reflecting element. This prevents the degradation of the characteristics of the polarization selecting element and the decrease in display quality due to the increase in temperature of the liquid crystal layer in the transmission-type liquid crystal display panel, caused by the light absorption and heat conversion, whereby reliability can be improved. Furthermore, as described above, the degree of polarization $P_1$ of linearly polarized light used for a display of the transmission-type liquid crystal display panel is determined by the combination of the polarization selecting and reflecting element and the first polarization selecting element. Therefore, even if the degree of polarization of the polarization selecting and reflecting element or the first polarization selecting element is less than the degree of polarization P of the polarization selecting element in the conventional projection-type image display apparatus, the contrast ratio of the display can be maintained or improved by prescribing the degree of polarization $P_1$ of the combination to be $P_1 \leq P$.

Furthermore, the transmittance of the polarization selecting and reflecting element or the polarization selecting element tends to increase as the degree of polarization thereof decreases. Therefore, the transmittance $T_1$ of the combination of the polarization selecting and reflecting element and the polarization selecting element satisfies $T_1 \leq T$ with respect to the transmittance T of the polarization selecting element in the conventional projection-type image display apparatus. Thus, according to the present invention, an image display apparatus having a bright image with outstanding use efficiency of light and excellent display quality can be obtained. In the case where the illumination unit has a concave mirror, since a light beam reflected by the polarization selecting and reflecting element is reflected by the concave mirror and incident upon the polarization selecting and reflecting element, the light beam generated by the alteration of a plane of polarization during this process is incident upon the liquid crystal display panel and contributes to the display. More specifically, for example, even if each degree of polarization of the polarization selecting and reflecting element and the first polarization selecting element is less than about 99%, as long as the degree of polarization of the combination thereof is at least about 99%, a bright projection-type image display apparatus with a contrast ratio of at least 100:1 can be realized.

Alternatively, according to the present invention, in the projection-type image display apparatus including the reflection-type liquid crystal display panel, the polarization selecting and reflecting element is provided on the illumination unit side of the polarization beam splitter, and the degree of polarization of the combination of the polarization beam splitter and the polarization selecting and reflecting element is at least about 99%. That is, in place of the polarization selecting element used in a conventional projection-type image display apparatus, the polarization selecting and reflecting element is used. As a result, the polarized light component which is absorbed and converted into heat by the polarization selecting element in the conventional projection-type image display apparatus is reflected by the polarization selecting and reflecting element. This prevents the decrease in display quality due to the temperature increase and the degradation of the characteristics of the polarizing plate, caused by light absorption, whereby reliability can be improved. Furthermore, the degree of polarization of the reflectiontype liquid crystal display panel with respect to linearly polarized light incident thereupon is determined by the combination of the polarization selecting and reflecting element and the polarization beam splitter. Therefore, even if the degree of polarization of the polarization selecting and reflecting element or the polarization beam splitter is less than the degree of polarization of the polarization selecting element in the conventional projection-type image display apparatus, the contrast ratio of the display can be maintained or improved by prescribing the degree of polarization of the combination to be at least a predetermined value. In the case where the illumination unit has a concave mirror, since a light beam reflected by the polarization selecting and reflecting element is reflected by the concave mirror and incident upon the polarization selecting and reflecting element, the light beam generated by the alteration of a plane of polarization is incident upon the liquid crystal display panel and contributes to the display. More specifically, for example, even if each degree of polarization of the polarization selecting and reflecting element and the polarization beam splitter is less than about 99%, as long as the degree of polarization of the combination thereof is at least about 99%, a bright projection-type image display apparatus with a contrast ratio of at least 100:1 can be realized. Furthermore, the polarization selecting element is further provided between the polarization selecting and reflecting element and the polarization beam splitter, whereby the degree of polarization of the combination thereof is kept at a predetermined value or more to further improve a contrast ratio.

As described above, according to the present invention, an image display apparatus can be obtained, which has an outstanding display quality with a bright image, is excellent in use efficiency of light and has outstanding reliability. As a result, the burden of a cooling system used together with the image display apparatus is reduced, and the image display apparatus may be miniaturized. Thus, according to the present invention, a small-sized and light-weight projection-type image display apparatus can be obtained, which has an outstanding use efficiency of light from the illumination unit, enables a bright image with a high contrast to be obtained, has an outstanding display quality, and can be produced at low cost.

The projection-type image display apparatus of the present invention can be preferably used for a liquid crystal television system, an information display system, and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection-type image display apparatus, comprising:

an illumination unit;

a polarization selecting and reflecting element which splits a light beam from the illumination unit into a first light beam and a second light beam having polarization states different from each other, reflects the first light beam to the illumination unit, and outputs the second light beam as linearly polarized light;

a transmission-type liquid crystal display panel which controls a polarization state of the linearly polarized light and displays an image;

a first polarization selecting element and a second polarization selecting element respectively provided on a light beam input side and a light beam output side of the transmission-type liquid crystal display panel; and a projection element which projects the image displayed by the transmission-type liquid crystal display panel, wherein a combination of the polarization selecting and reflecting element and the first polarization selecting element has a degree of polarization of at least about 99%, and at least one of the polarization selecting and reflecting element and the first polarization selecting element has a degree of polarization of less than about 99%.

2. A projection-type image display apparatus according to claim 1, wherein the polarization selecting and reflecting element is a circularly polarized light selecting and reflecting element which splits a light beam into first circularly polarized light and second circularly polarized light having rotation directions different from each other, reflects the first circularly polarized light, and converts the second circularly polarized light into linearly polarized light and outputs the linearly polarized light.

3. A projection-type image display apparatus according to claim 1, wherein the polarization selecting and reflecting element is a linearly polarized light selecting and reflecting element which splits a light beam into first linearly polarized light and second linearly polarized light having polarization axes different from each other by 90°, reflects the first linearly polarized light, and transmits the second linearly polarized light.

4. A projection-type image display apparatus, comprising:

an illumination unit;

a polarization selecting and reflecting element which splits a light beam from the illumination unit into a first light beam and a second light beam having polarization states different from each other, reflects the first light beam to the illumination unit, and outputs the second light beam as linearly polarized light;

a polarization beam splitter upon which the linearly polarized light is incident;

a reflection-type liquid crystal display panel which controls a polarization state of the linearly polarized light incident through the polarization beam splitter and displays an image; and a projection element which projects the image displayed by the reflection-type liquid crystal display panel, wherein a combination of the polarization selecting and reflecting element and the polarization beam splitter has a degree of polarization of at least about 99%, and at least one of the polarization selecting and reflecting element and the polarization beam splitter has a degree of polarization of less than about 99%.

5. A projection-type image display apparatus according to claim 4, wherein the polarization selecting and reflecting element is a circularly polarized light selecting and reflecting element which splits a light beam into first circularly polarized light and second circularly polarized light having rotation directions different from each other, reflects the first circularly polarized light, and converts the second circularly polarized light into linearly polarized light and outputs the linearly polarized light.

6. A projection-type image display apparatus according to claim 4, wherein the polarization selecting and reflecting element is a linearly polarized light selecting and reflecting element which splits a light beam into first linearly polarized light and second linearly polarized light having polarization axes different from each other by 90°, reflects the first linearly polarized light, and transmits the second linearly polarized light.

7. A projection-type image display apparatus according to claim 4, further comprising a polarization selecting element between the polarization selecting and reflecting element and the polarization beam splitter.

* * * * *